Figures 1, 2:
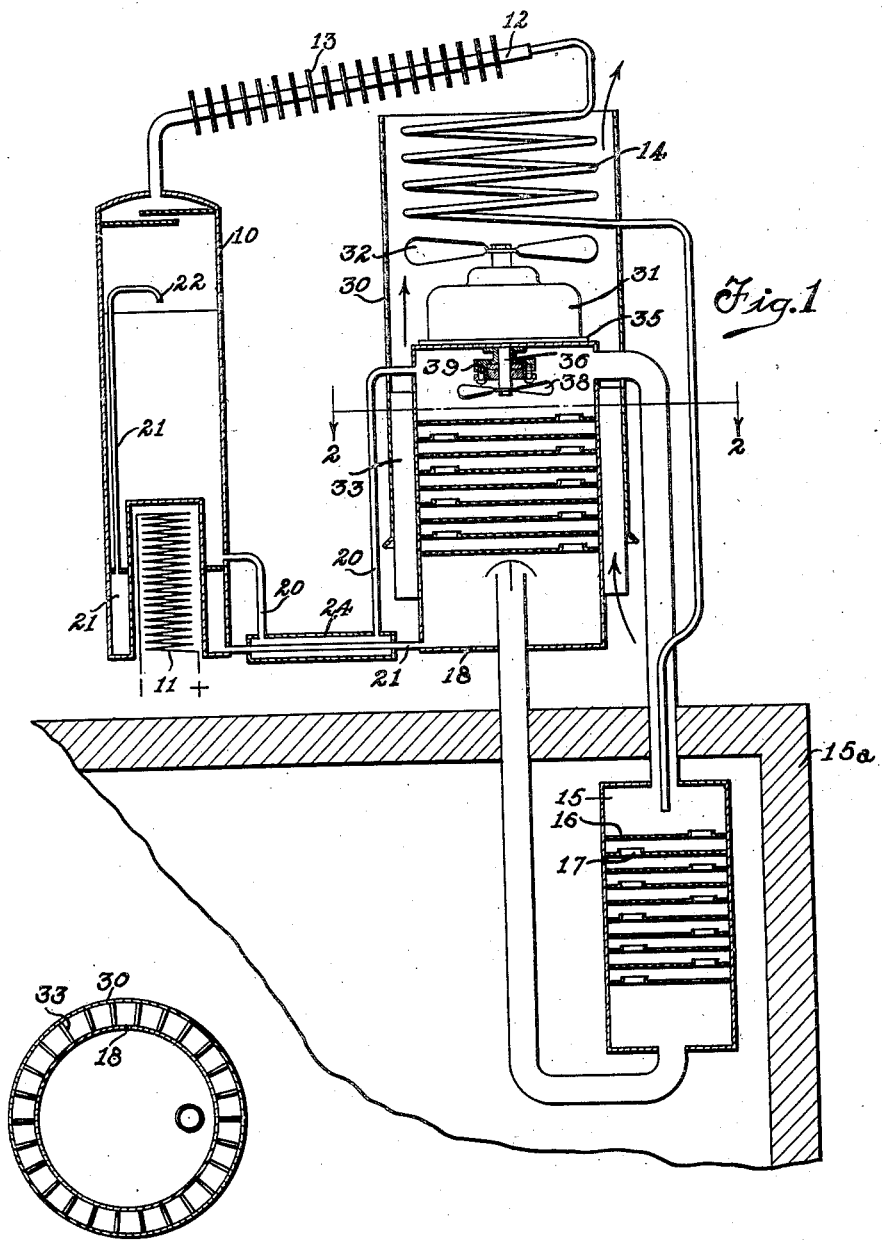

May 3, 1932.  H. B. HULL  1,856,765
REFRIGERATING APPARATUS
Filed Dec. 31, 1928

Inventor
Harry B. Hull
By Spencer Hardman & Fehr
Attorney

Patented May 3, 1932

1,856,765

UNITED STATES PATENT OFFICE

HARRY B. HULL, OF DAYTON, OHIO, ASSIGNOR TO FRIGIDAIRE CORPORATION, OF DAYTON, OHIO, A CORPORATION OF DELAWARE

REFRIGERATING APPARATUS

Application filed December 31, 1928. Serial No. 329,496.

This invention relates to refrigerating apparatus of the partial pressure type.

One of the objects of the invention is to provide an improved and simplified arrangement for circulating the inert gas in the system.

Another object of the invention is to provide an improved arrangement for cooling the absorber and condenser.

Still another object is to provide an improved and simplified arrangement of parts which is economical to manufacture and reliable in operation.

Further objects and advantages of the present invention will be apparent from the following description, reference being had to the accompanying drawings, wherein a preferred embodiment of the present invention is clearly shown.

In the drawings

Fig. 1 is a diagrammatic illustration of a refrigerating system embodying the invention, and Fig. 2 is a section on the line 2—2 of Fig. 1.

Absorption refrigerating systems of the partial pressure type have previously been proposed in which an inert gas is mixed with the refrigerant and circulated between the absorber and evaporator to equalize the total pressure existing throughout the system, an example of such an arrangement being shown in the patent to Geppert, Serial No. 662,690, filed November 27, 1900. In systems of this character it is necessary to make provision for circulating the inert gas between the absorber (wherein it is separated from the evaporated refrigerant) and the evaporator (wherein it adds its partial pressure to that of the refrigerant to produce the total pressure required to maintain the system in equilibrium.)

In the drawings, 10 designates any suitable generator which may be charged, for example, with aqua ammonia and heated by means of any suitable heating device 11 to distill the ammonia from the solution. The distilled ammonia passes through a dehydrator 12 cooled by fins 13 wherein any evaporated water is condensed and returned by gravity to the generator. The ammonia vapor then passes through a condenser 14 where it is condensed to liquid which then flows into the evaporator 15 which may be placed in any suitable refrigerating cabinet 15a. The evaporator preferably consists of a number of shallow pans 16 having openings 17 in staggered relation. The liquid ammonia flows through the openings from one pan to another until all of the pans are filled with a thin layer of liquid. Inert gas such as carbon dioxide is introduced into the system to equalize the total pressure between the high pressure required for distillation in the generator and the low ammonia pressure required for evaporation in the evaporator. The evaporator is connected both at its top and bottom with the top and bottom respectively of an absorber 18 which has an arrangement of fins similar to that in the evaporator. The top of the absorber is connected with the bottom of the generator by means of a conduit 20 which supplies weak liquor to the absorber for absorbing the evaporated refrigerant. The strong liquor resulting from the absorption of the refrigerant flows back to the generator by means of conduit 21 which surrounds the heater 11 and has its outlet 22 in the generator above the level of the liquid therein. The heater 11 and conduit 21 form a vapor lift device for raising the strong liquor to the level of the generator. Preferably the conduits 20 and 21 form a heat exchanger 24 for pre-cooling the weak liquor as it flows from the hot generator to the cool absorber and preheating the strong liquor as it flows from the cool absorber to the hot generator.

I provide an improved arrangement for cooling the absorber and the condenser. Both the absorber and the condenser are placed within a flue 30, the condenser being above the absorber. Between the condenser and absorber is a motor 31 which drives a fan 32 for producing a draft through the flue. The absorber is provided on its exterior surface with fins 33 for facilitating heat transfer to the air currents. Cool air is drawn in at the bottom of the flue and passes first over the absorber and subsequently over the condenser. This absorbs the heat of the absorption of refrigerant from the absorber as well as the heat of condensation from the condenser. The motor 31 is preferably mounted on a plate 35 which is hermetically sealed to and forms a part of the absorber. The motor shaft 36 extends through this plate and carries a fan 38 within the absorber. A gas tight seal is formed between the motor shaft and absorber by any suitable device such as a stuffing box or packing gland 39.

The motor is continuously operated to draw air through the flue, cooling the absorber and condenser, the fan setting up a positive circulation of inert gas between the absorber and evaporator. The above described system operates as follows:

The generator is continuously heated and continuously supplies refrigerant vapor at a high refrigerant pressure to the condenser which in turn supplies liquid refrigerant continuously to the evaporator. In the evaporator the refrigerant is under a total pressure equal to the pressure of the generator due to the pressure of the inert gas, but the partial pressure of refrigerant in the evaporator is low so that evaporation readily takes place, the vapor being absorbed by the weak liquor in the absorber. Upon absorption of the refrigerant vapor, the inert gas is liberated and is returned to the evaporator. Since the fan 38 sets up a positive circulation of the inert gas, any desired inert gas may be used irrespective of its density. Moreover this arrangement affords considerable latitude in the choice of location of the evaporator with reference to the absorber. For example the evaporator may be disposed below the rest of the apparatus so that the condensing and absorbing portion of the apparatus may be mounted on top of a refrigerating cabinet 15a, while the evaporator may be disposed in the cabinet, the whole system forming a unitary structure which is readily removed from the cabinet.

While the form of embodiment of the invention as herein disclosed constitutes a preferred form, it is to be understood that other forms might be adopted, all coming within the scope of the claims which follow.

What is claimed is as follows:

1. In refrigerating apparatus of the partial pressure type a closed circuit including an absorber and an evaporator, means in the circuit for circulating inert gas, means outside the circuit for circulating air to cool the absorber, and a common driving means for operating both the circulating means.

2. In refrigerating apparatus of the partial pressure type a closed circuit including an absorber, a condenser and an evaporator, means in the circuit for circulating inert gas, means outside the circuit for circulating air to cool the condenser and the absorber, and a common driving means for operating both the circulating means.

3. In refrigerating apparatus of the partial pressure type a closed circuit including an absorber and an evaporator, a fan within the circuit for circulating inert gas, a fan outside the circuit for circulating air to cool the absorber, and a single motor for operating both fans.

4. In refrigerating apparatus of the partial pressure type a closed circuit including an absorber and an evaporator, a fan within the circuit for circulating inert gas, a fan outside the circuit for circulating air to cool the absorber, a motor outside the circuit for driving said last-mentioned fan, and sealed means for transmitting power from the motor to the fan within the circuit.

5. In refrigerating apparatus of the partial pressure type a closed circuit including an absorber and an evaporator, a motor having a shaft, a fan on each end of the shaft, one of the fans being disposed outside the circuit for cooling the absorber, and the other fan being inside the circuit for circulating inert gas, and means cooperating with the shaft for sealing the circuit from the atmosphere.

6. In a refrigerating apparatus of the partial pressure type, a closed circuit including a generator, an absorber, a condenser and an evaporator, the evaporator being disposed below the level of the rest of the circuit and a circulating device in the circuit for circulating inert gas between the absorber and evaporator.

7. Refrigerating apparatus of the partial pressure type comprising a generator, a condenser, an absorber, and an evaporator interconnected to form a closed circuit, means for circulating inert gas between the absorber and the evaporator, means for circulating the air to cool said condenser, and a common driving means for operating both the circulating means.

In testimony whereof I hereto affix my signature.

HARRY B. HULL.